C. M. WILKINS.
Cheese Vat.
No. 26,222. Patented Nov. 22, 1859.
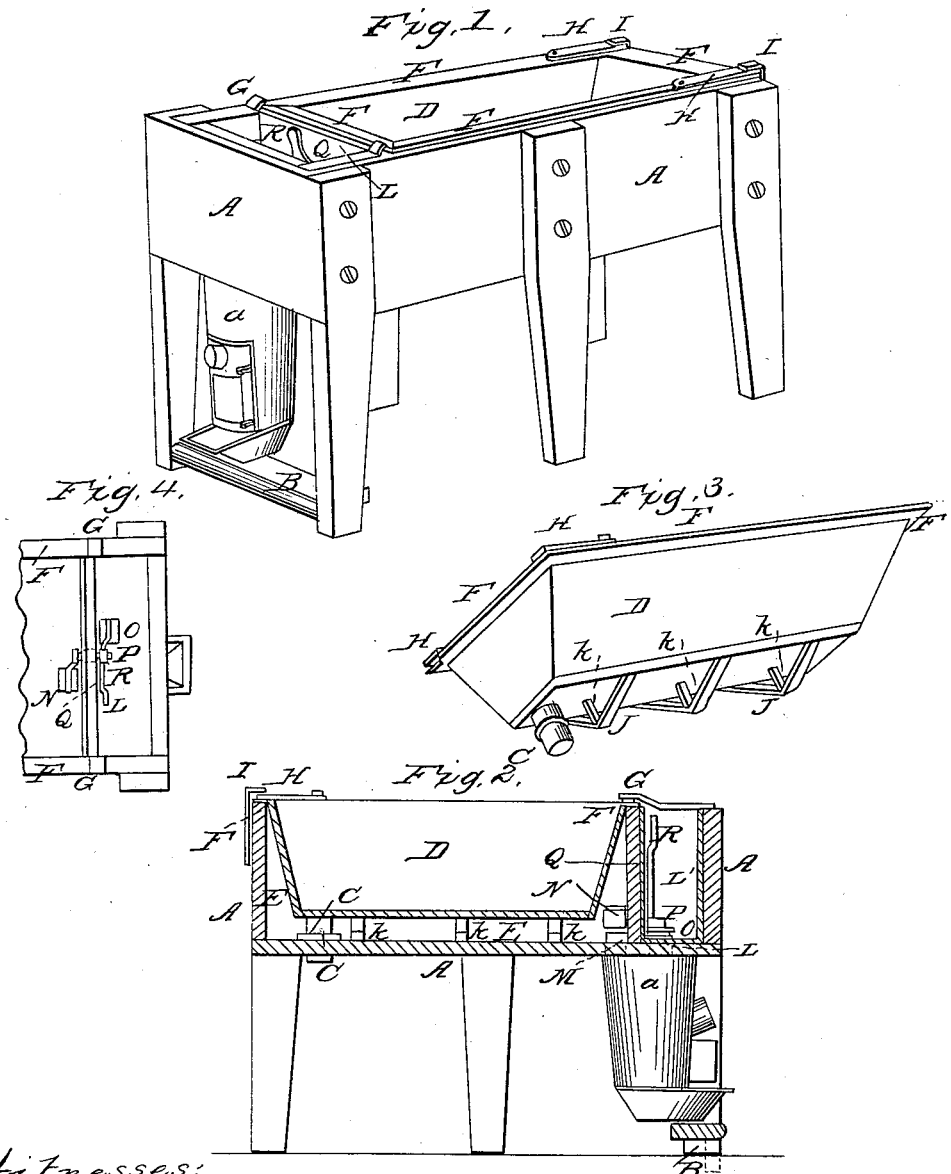

UNITED STATES PATENT OFFICE.

C. M. WILKINS, OF MADISON, OHIO.

CHEESE-VAT.

Specification of Letters Patent No. 26,222, dated November 22, 1859.

*To all whom it may concern:*

Be it known that I, C. M. WILKINS, of Madison, in the county of Lake and State of Ohio, have invented certain new and useful Improvements in Cheese-Vats; and I do hereby declare that the following is a full, clear, and exact description of the same, reference being had to the annexed drawings, making part of this specification, in which—

Figure 1, is a perspective view; Fig. 2, a longitudinal section; Figs. 3, and 4, are sections which will be referred to in description.

Like letters denote like parts, in the several views.

The nature of my improvement consists in part, in providing the bottom of an ordinary metallic cheese vat, or tank, with truss braces designated by the letters J, J, J, which extend across the bottom of the tank from one side to the other, and about in the center of these trusses, and connected with them and the bottom of the tank is a brace K, which gives additional strength to the trusses. By means of these truss braces the bottom, or floor, of the tank is very much strengthened. It is found in practice, that the milk, &c., in the tank causes the floor of it to bulge and sink down, and the pressure of steam, and water in the vat forces up the floor of the tank. Thus the floor of the tank is forced up, and down, according to the pressure above, or below. This working of the floor of the tank causes it to crack, and the joints to separate. By the use of the truss braces this difficulty does not occur, as the tank is rendered stronger, and more durable, and not subject to the working, or bulging, of the floor by the cause before stated.

In all ordinary cases the tank is made of sheet tin, it being the cheapest, and most desirable material for this purpose, but in all cases the floor is liable to crack and the joints open from the cause before stated, which difficulty it is seldom convenient to correct without stopping, or delaying, the cheese making to which there are serious objections. But by the introduction of the truss braces these difficulties are obviated.

From the heater extends a pipe, or tube, L, into the chamber L', and a pipe M, also extends from the heater into the vat, in connection with the pipes L, and M, are arranged two valves N, and O, Figs. 2, and 4. These two valves are attached to the shaft P, by two arms. This shaft passes from the chamber L', to the vat, through the partition Q, which divides the chamber from the vat. To the shaft P, is attached the lever R, so that by the action of this lever the valves are simultaneously operated so as to open or close either of the pipes L, and M, or they may be both opened at once. By the action of the lever R, the valve N, may be so moved as to close the opening in the pipe M, which will exclude the passage of water into the vat, and allow the water to pass from the heater into the chamber through the pipe L. This pipe may be closed by the valve O, by the action of the lever, which will exclude the water from the chamber L', and cause the communication with the heater, and vat, to be opened by the raising of the valve N, when the pipe L, is closed thus the communication between the heater, and chamber, and vat, may be alternately opened and closed. The valves N, and O, may be so moved as to leave both passages into the chamber, and vat from the heater open, leaving a direct communication between the chamber L' and the vat, in consequence of which the funnel (through which an ordinary cheese vat is filled with water) is dispensed with.

I am aware that various kinds of cheese vats have been known and used, but what distinguishes my vat from all others is the arrangement of the valves and openings in the chamber, and vat, so that the water may be admitted, or excluded, as the nature of the case may require. This water chamber in practice is found to be of great utility, and convenience for various uses in the manufacture of cheese, when used in combination with the valves N, and O, as described. My improvement is further distinguished from others by the use of the truss braces K for the purpose hereinbefore stated. One or more of these truss braces may be used according to the size of the vat.

There are various other devices used for supporting the bottom of a cheese vat; there are also other devices used for the same purpose for which I use the valves N, and O, all of which with the other parts of a cheese vat, I disclaim; but What I do claim, and desire to secure by Letters Patent, is—

The arrangement of the valves N, and O, within the water chamber and vat substantially as described.

C. M. WILKINS.

Witnesses:
W. H. BURRIDGE,
GEO. C. DOLPH.